March 8, 1927.

E. H. REMDE

INDUSTRIAL TRUCK

Filed Aug. 19, 1924

INVENTOR.
Edward N. Remde
BY
Edward R. Alexander
ATTORNEY.

March 8, 1927.
E. H. REMDE
INDUSTRIAL TRUCK
Filed Aug. 19, 1924
3 Sheets-Sheet 2
1,620,038
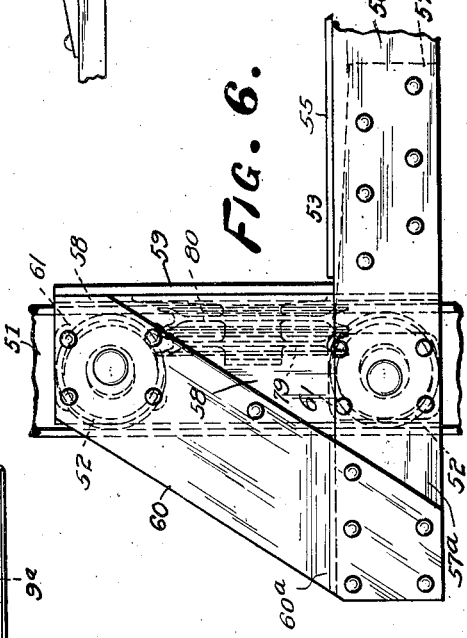
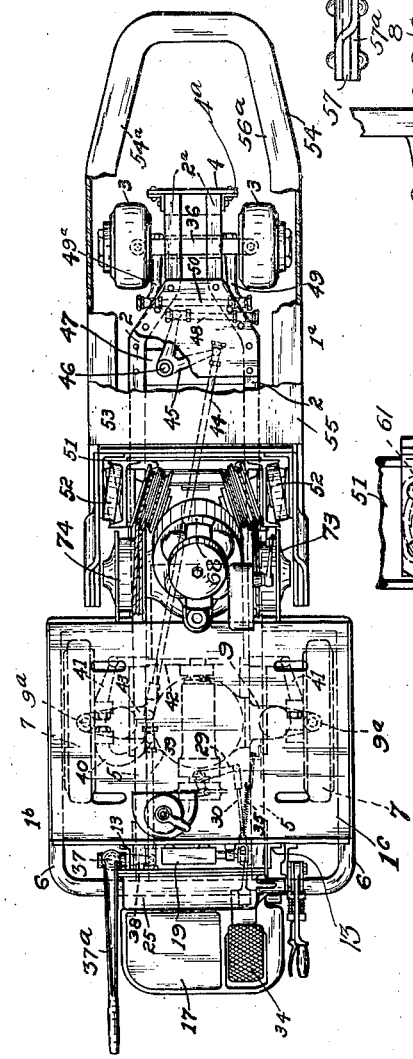
INVENTOR.
Edward H. Remde
BY
Edward R. Alexander
ATTORNEY.

March 8, 1927. 1,620,038

E. H. REMDE

INDUSTRIAL TRUCK

Filed Aug. 19, 1924 3 Sheets-Sheet 3

INVENTOR.
Edward H. Remde
BY Edward R. Alexander
ATTORNEY.

Patented Mar. 8, 1927.

1,620,038

UNITED STATES PATENT OFFICE.

EDWARD H. REMDE, OF CLEVELAND, OHIO, ASSIGNOR TO THE BAKER-RAULANG COMPANY, OF CLEVELAND, OHIO, A CORPORATION OF OHIO.

INDUSTRIAL TRUCK.

Application filed August 19, 1924. Serial No. 732,979.

This invention relates to an industrial truck capable of lifting, piling, lowering, and transporting goods, crates and boxes.

One object of the invention is to provide a truck of this character of relatively simple and economical construction.

Another object of the invention is to construct a truck of this character that is relatively light without sacrificing its durability and capacity.

Other objects of the invention will be apparent to those skilled in the art to which my invention relates from the following description taken in connection with the accompanying drawings.

Fig. 2 is a top plan view of the truck, with parts broken away, to facilitate the illustration.

Fig. 5 is a fragmentary section partly on the line 5—5 and partly on the line 5ª—5ª of Fig. 1.

Fig. 6 is a side elevation of the parts shown in Fig. 5.

Figure 1:
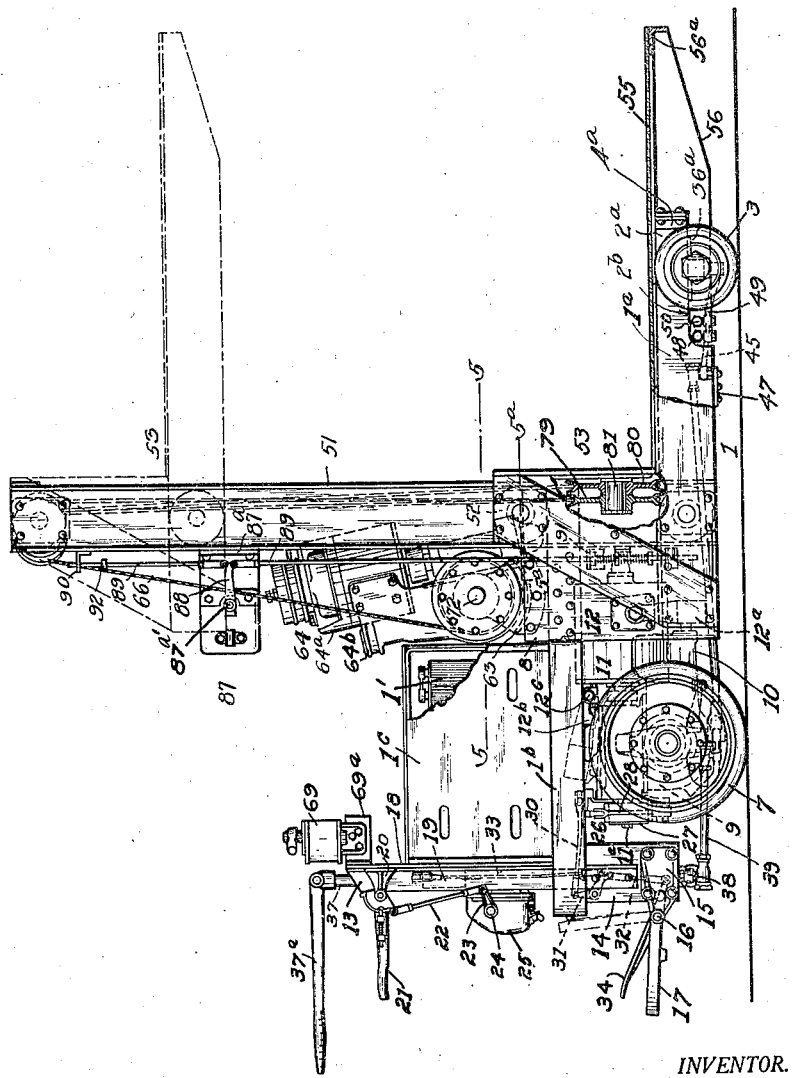
Fig. 1 is a side elevation, parts being broken away, of an industrial truck embodying my invention.

In the drawings, 1 indicates as an entirety a frame. The frame 1 comprises a relatively low section 1ª and an elevated section 1ᵇ. The low section 1ª comprises a pair of spaced channel bars 2, having inset portions 2ª at or adjacent their outer ends to provide ample room for a pair of relatively small supporting or trailing wheels 3, their free ends being connected by a plate 4 which is secured by angles 4ª to each bar (see Fig. 2). The elevated section 1ᵇ preferably comprises a pair of longitudinally extending channel bars 5 and a pair of U-shaped channel bars 6 which provide lateral extensions or sides to house or overlie the traction wheels 7, as shown in Fig. 2, and a suitable base for a suitable power plant or other source of power supply, for example, the batteries 1' to supply current to operate the truck. 1ᶜ indicates a casing for the batteries 1'. The longitudinal bars 5, 5, at their inner ends, overlap the inner ends of the bars 2, 2, so that each bar 5 and the adjacent bar 2 can be rigidly connected by a gusset 8. For this purpose, the bars 5 and 2 are disposed so that their outer faces are in the same vertical plane. The gussets 8 extend upwardly above the bars 5 for a purpose to be later set forth.

9 indicates the axle for the traction wheels, the housing thereof being provided with knuckles 9ª to pivotally mount the wheels 7 thereon, whereby they may be steered. The axle housing is provided with an extension 10 which forms a cradle for a motor 11 (preferably of the electric type), the shaft of which is connected with and drives the live axles of the axle 9 in a well known manner. 12 indicates supporting means for the motor and axle permitting movement thereof relative to the frame 1 during operation of the truck, such means including a torque member 12ª preferably mounted to rock on the gussets 8 and a thrust member 12ᵇ preferably mounted to rock on a shaft 12ᶜ carried by the bars 5.

13 indicates a pair of uprights, preferably formed of angle bars, being secured to the outer faces of the bars 5 (see Fig. 2) and extending upwardly and downwardly relative thereto. The depending portions of the uprights 13 support side plates 14, which in turn carry brackets 15. 16 indicates a shaft supported at its opposite ends in knuckles or bosses provided on the brackets 15. 17 indicates a platform on which the operator stands while operating the truck. The inner edge of the platform 17 is pivoted on the shaft 16 to swing upwardly (see dotted lines in Fig. 1) when not in use. The upper portions of the uprights 13 support a dash 18 on which is mounted an automatic switch mechanism 19 and a bracket 20 for a controller handle 21. The handle 21 is connected by a link 22 with an arm 23, which is connected to and rocks a shaft 24, operatively connected to the drum of a controller 25. The controller 25 is mounted on the uprights 13.

26 indicates as an entirety a brake mechanism for the truck. Of this mechanism, 27 indicates a brake wheel fixed to the extended end of the propeller shaft 11ª. 28 indicates a pair of brake shoes arranged to operatively engage the wheel 27, said shoes being controlled by a cam connected to a lever, which in turn is connected to one arm of a bell crank 29. The bell crank 29 is pivotally mounted on a suitable stud-shaft carried by the housing for the axle 9 or driving connections between it and the motor 11. 30 indicates a link connected at one end to the other arm of the bell crank 29 and at its opposite end to one arm of a second bell crank 31 pivotally mounted on the inner face of the adjacent plate 14. The other arm of the bell crank 31 is provided with two knuckles, one forming a pivot connection for one end of a rod 32 and the other forming a pivot connection for one end of a rod 33. The opposite end of the rod 32 is pivotally connected to the tail of a foot pedal 34 mounted to rock on the shaft 16, whereas the rod 33 extends upwardly and is connected at its upper end to the switch mechanism 19. 35 indicates a spring connected at one end to the frame 1, preferably to the adjacent bar 5. The other end of the spring 35 is connected to the link 30 and operates therethrough normally to apply the brake shoes 28 to the wheel 27 and to swing the pedal 34 to the position shown in Fig. 1. Accordingly, pressure on the pedal 34 will swing it downwardly and release the brake shoes 28, thus putting the spring 35 under tension. By means of the rod 33 inter-connecting the brake mechanism 26 and switch mechanism 19, the latter is rendered inoperative when the brake shoes 28 are in applied position. As the switch mechanism and its connection with the brake mechanism forms no part of the present invention, detail description and illustration thereof is not deemed necessary.

36 indicates an axle secured to the inset portions 2$^a$ of the bars 2, the latter being preferably cut away, as shown at 2$^b$ in Fig. 1, to permit the engagement of the bars with the upper surface of the axle 36, the latter being secured to the bars in any desired manner, for example, by angle plates 36$^a$. The opposite ends of the axle 36 are preferably provided with suitable knuckles, each arranged between and aligned with a pair of knuckles provided on the inner end of the spindle for the adjacent wheel 3 and pivotally connected to such knuckles to permit swinging movement of the wheel for steering purposes.

The steering connections may be arranged to steer all four wheels simultaneously, and preferably comprise the following elements: 37 indicates a post or rod rotatively mounted in suitable bearings provided in one or more brackets mounted on one of the uprights 13. At its upper end the post 37 is provided with a handle 37$^a$ preferably pivoted at its inner end to the post 37. At its lower end, the post 37 carries an arm 38 to which is pivotally connected a rod 39. The rod 39 connects the arm 38 to a lever 40 fixed to the spindle of the adjacent traction wheel 7. 41, 41, indicates a pair of arms, each projecting from the spindle for one of the wheels 7 and connected at their free ends by a link 42, whereby the wheels 7 are connected for movement together about their knuckles. 43 indicates a separate arm extending from the spindle for one of the wheels 7 (preferably that spindle to which the lever 40 is connected) and pivotally connected at its outer end to one end of a rod 44. The opposite end of the rod 44 is pivotally connected to one arm of a bell crank 45 mounted to rock on an upstanding stud shaft 46 carried by a cross member 47. The other arm of the bell crank 45 is connected by a link 48 to an arm 49 fixed to the spindle for the adjacent wheel 3 and the arm 49 is connected by a tie rod 50 with an arm 49$^a$ fixed to the spindle for the other wheel 3.

51 indicates a pair of guides extending vertically and preferably disposed intermediate the frame 1, and at the rear end of the elevated frame section 1$^b$. The guides 51 preferably comprise I-beams extending from the lower side of the bars 2 upwardly to the desired height. As shown in Figs. 1 and 5, the I-beams 51 are disposed relatively close together, this arrangement providing for the mounting of the guide shoes or rollers 52 of the elevating member (indicated as an entirety at 53) in the outer channels of the I-beams and the rigid connection of the latter with both the bars 2 and 5 through the gussets 8, preferably along or adjacent their outer edges by rivets or other means. To permit of this arrangement the inwardly extending flanges of the I-beams 51 are cut away so that the inner sides of the I-beams may be secured in face-to-face relation with the outer sides of the channel bars 2, 5.

As shown in Fig. 1, the bars 2, 5, overlap each other a considerable distance and the gussets have a width equal to such overlap, so that a large area is provided for the securing means between each gusset and each bar to insure a rigid construction and fixed relation between the elevated and low frame sections. As the web or body portions of the I-beams are connected to the faces of the gussets 8 from their lower edges to their upper edges, they will be maintained in vertical position and any stresses on the gussets due to loads on the elevating member 53 will be transmitted to the gussets 8 in substantially an endwise direction. Accordingly, such gussets will withstand such stresses with minimum distortion.

Of the elevating member 53, 54 indicates an angle bar bent into substantially U-shape to form a horizontally extending load carrying section 54$^a$ to support a plate 55. The bar 54 provides depending sides 56 for the load carrying section and a flange 56$^a$ to support the plate 55, the latter being preferably riveted to the flange 56ᵃ near the opposite ends of the bar 54 is cut away on a transverse line at or adjacent the inner edge of the plate 55 so that the side portions 56 of the bar may project inwardly to provide arms 57 preferably reinforced by plates 57ᵃ which extend outwardly to a point below the flange 56ᵃ, as shown in Fig. 6. 58 indicates a pair of angle plates having their walls positioned against the inner edges of the flange 56ᵃ and inner faces of the plates 57ᵃ and projecting upwardly and connected together above the bar 54 by a plate 59. As shown in Fig. 5, the inner cutaway edges of the flange 56ᵃ are in a transverse plane outwardly of the I-beam 51, so that the inturned walls of the bars 58 and connecting plate 59 do not engage with the I-beams as the elevating member 53 moves vertically. 60 indicates a pair of connecting plates each extending between the upper end of one angle bar 58 to the outer end of the adjacent arm 57 and rigidly connected at its opposite ends thereto, the lower end of the plate being off-set, as shown at 60ᵃ (Fig. 5), so that it may be secured to the outer face of the arm 57. 61 indicates pairs of supports secured in any desired manner to the inner sides of the angle bars 58 and supporting stud shafts 62 on which are loosely mounted the rollers 52. As will be understood from Figs. 2, 5, and 6, the free ends of the shafts 62 are disposed at inclined angles corresponding to the inclined inner or opposing faces of the flanges of the I-beams 51, with which faces the rollers 52 engage, so that the latter may roll thereon without undue friction, the rollers on each bar 58 being arranged at different angles with respect to each other since the upper roller 52 engages the front flange and the lower roller 52 engages the rear flange.

63 indicates a pair of standards fixed or connected at their lower ends to the upwardly extending ends of the gussets 8 and support a power unit, indicated as an entirety at 64, operating through a pair of flexible members, such as cables 65, 66, to raise and lower the elevating member 53. The power unit 64 comprises a casting forming a housing 64ᵃ for a worm gear 67 and an extension 64ᵇ forming a cradle. 68 indicates an electric motor mounted in the cradle 64ᵇ and supplied with current from the batteries 1' and operated through a suitable controller 69. The controller 69 is mounted on a bracket 69ᵃ carried by the dash 18. The shaft of the motor 68 is connected to a propeller shaft 70 to which is secured a worm 71 meshing with the worm gear 67. The propeller shaft 70 is mounted in bearings in the casing element 70ᵃ which forms part of the housing 64ᵃ. 72 indicates a shaft keyed to the gear 67 and driven thereby. The shaft 72 is mounted in suitable bearings provided within the housing 64ᵃ and projects laterally through openings in the side walls thereof. 73, 74, indicate drums fixed to the extended ends of the shaft 72 and driven thereby to wind the cables 65, 66, respectively, thereon and therefrom.

Figure 7:
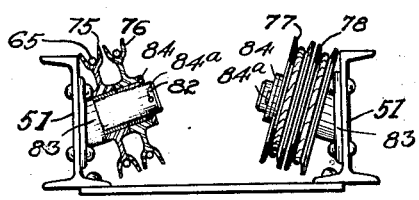
Fig. 7 is a plan view of the guide frame, but showing two of the sheaves in section.

75, 76, and 77, 78, indicate pairs of sheaves, each pair being mounted at the upper end of one of the I-beams and on the inner side thereof. 79, 80, indicate a pair of sheaves mounted on the inner face of the plate 59. The sheaves 79, 80, are loosely mounted on a shaft 81 mounted in an opening formed in a thickened portion of the plate 59, the shaft 81 being preferably arranged at a point substantially midway between the guides 51. Each pair of sheaves 75—76, 77—78, is loosely mounted on a stud or shaft 82 supported in a base 83, the flange of which is rigidly secured to the inner face of the adjacent I-beams 51 by rivets or other suitable means, the sheaves being preferably held on the shaft by a washer 84 and a cotter pin 84ᵃ. As shown particularly in Fig. 7, the shafts 82 are inclined at angles to the guides so as to support the sheaves 75—76 and 77—78 in inclined planes, this arrangement providing a saving in the over-all length of the frame 1 by permitting the guides 51 to be positioned relatively near the drums and the operation of the cables 65, 66, without engaging the motor. By arranging the guide rollers on the outside of the guides 51, I am enabled to position the sheaves 75—76, 77—78, on the inner sides thereof, and thereby materially reduce the height of the truck and eliminate unnecessary mechanism at the top of the guides.

The cables 65, 66, reeve about the sheaves as follows: The cable 65 leads from the drum 73 upwardly around the sheave 75 and then downwardly around the sheave 80; from the sheave 80, the cable 65 extends upwardly around the sheave 77 and then downwardly, its free end being anchored to one end of an equalizing bar 85 carried by a take-up mechanism indicated as an entirety at 86. The cable 66 leads from the drum 74 upwardly around the sheave 78 and then downwardly around the sheave 79; from the sheave 79, the cable 66 extends upwardly around the sheave 76 and then downwardly, its free end being anchored to the opposite end of the equalizing bar 85.

87 indicates a switch mechanism supported by an angle plate 87ᵃ on one of the guides 51. The mechanism comprises switches either of which is operated when the shaft 87ᵃ' is rocked in one direction. The shaft 87ᵃ' carries an arm 88 to which are pivotally connected the inner ends of the rods 89, one extending upwardly and guided for endwise movement by the walls of an opening formed in a bracket 90 and the other extending downwardly and guided at its lower end for endwise movement by a bracket 91; the bracket 90 being carried by the rear flange of the adjacent I-beam and the bracket 91 being carried by the adjacent bar 2. 92 indicates collars, adjustably fixed to the rods 89 and adapted to be engaged by a striker 93 carried by the elevating member 53, so that when the latter is moved in either direction, the striker 93, operating through one of the collars 92, moves the rods which in turn will open one of the switches of the switch mechanisms 87 and thus break the circuit to the motor 68.

Figure 3:
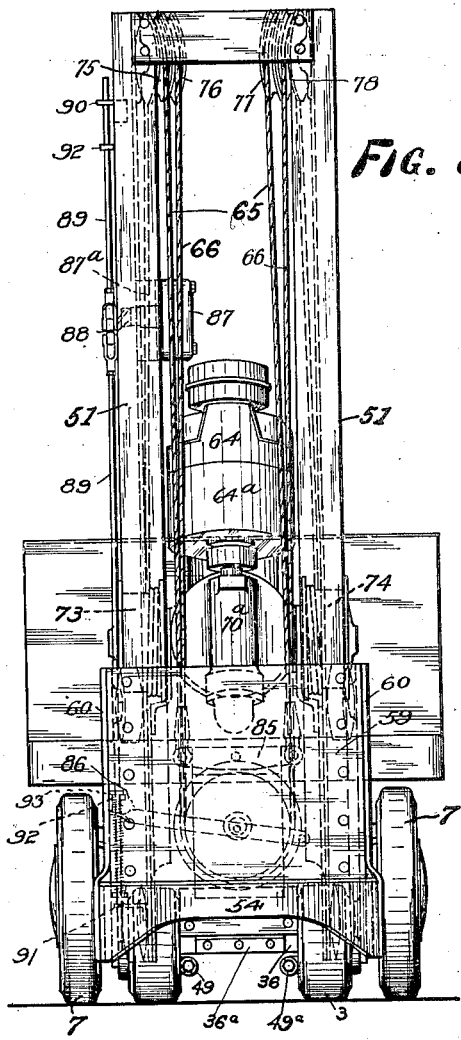
Fig. 3 is an end view of the truck looking toward the left of Figs. 1 and 2.
Figure 4:
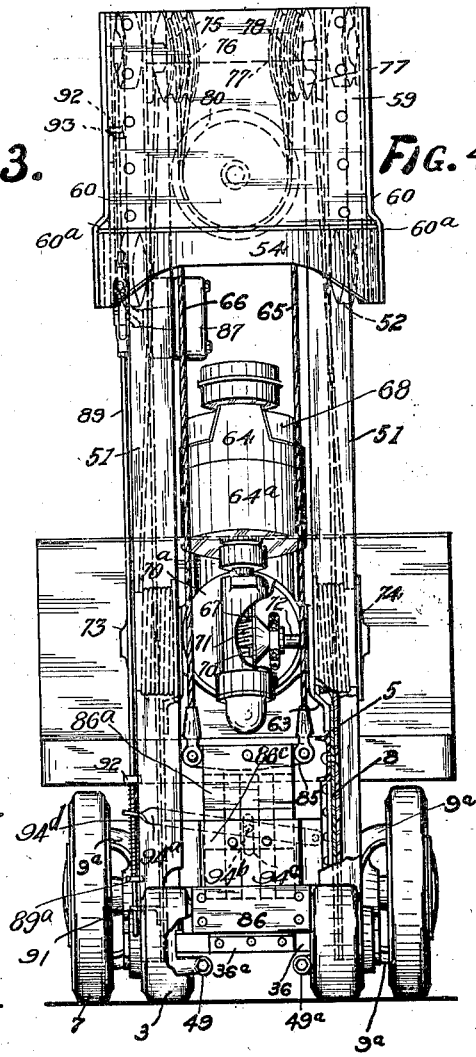
Fig. 4 is a view similar to Fig. 3, but showing the elevating member in raised position.

94 indicates a mechanism interposed between the take-up mechanism 86 and switch mechanism 87 and serving to operate the latter when the take-up mechanism operates. The take-up mechanism 86 is for the purpose of taking up all slack in the cables 65, 66, in the event the elevating member 53 becomes wedged or meets with an obstruction in its downward movement, this mechanism and the switch operating mechanism associated with it being the invention of Amiel G. Hutzley and forming the subject-matter of a separate application filed by him. The take-up mechanism as shown herein, comprises a relatively heavy member 86ª slidably supported by and between a cross plate 86ᵇ and a yoke 86ᶜ (see Fig. 5), the lower end of the member 86ª having lateral extensions as shown in Figs. 3 and 4, which engage the lower edge of the yoke 86ᶜ and limit the upward movement of the member 86ª incident to the pull on the cables 65, 66. If slack occurs in the cables 65, 66, for reasons above set forth, the member 86ª will gravitate downwardly and thus take up this slack and thereby prevent the cables from jumping any of the sheaves or getting dislocated on the drums 73, 74. The operating mechanism 94 comprises a lever 94ª pivoted at one end to some portion of the frame and formed at its opposite or free end with an opening through which the adjacent rod 89 extends. Intermediate its ends, the lever 94ª is provided with a projection 94ᵇ which extends into a slot 94ᶜ formed in the member 86ª, so that when the latter gravitates downwardly, as already set forth, the end wall of the slot will engage the projection 94ᵇ and through it swing the outer end of the lever downwardly. 94ᵈ indicates a spring coiled around the rod 89 and disposed between the lever 94ª and a collar 89ª adjustably fixed to the rod 89. Accordingly, the downward movement of the lever 94ª will be transmitted through the spring 94ᵈ and collar 89ª to move the rod 89 and thus operate the switch mechanism 87 to stop the motor 68.

In my construction relatively few parts are carried at or near the upper ends of the guides for the elevating member. By rigidly connecting the channel bars of the frame sections and lower ends of the guides together, I eliminate all tie-rods and other connecting or bracing members between the guides and the frame, so that a relatively low center of gravity is obtained.

From the foregoing description it will be seen that my truck is relatively simple, light and economical in construction, and that in accomplishing these results, the strength, capacity, and durability and easy operation of the truck have been maintained.

To those skilled in the art to which my invention relates, many changes in construction and widely differing embodiments and applications of my invention will suggest themselves without departing from the spirit and scope thereof. My disclosures and the description herein are purely illustrative and are not intended to be in any sense limiting.

What I claim is:

1. In apparatus of the class described, the combination of a frame comprising a relatively low section, an elevated section overlapping at its inner end the inner end of said low section and gussets connected along their upper and lower edges to the overlapping portions of said sections, supporting and traction wheels for said frame sections, respectively, a pair of guides secured to said gussets and extending upwardly from said low section, an elevating member engaging said guides, a power unit on said elevated section, having a winding drum, and means including a flexible member and sheaves for raising and lowering said elevating member.

2. In apparatus of the class described, the combination of a frame comprising a pair of bars forming a relatively low section and a pair of bars in a plane above said low section and overlapping the inner end thereof and forming an elevated section, corresponding bars of said pairs being disposed in the same vertical plane, a gusset connected along its upper and lower edges to adjacent bars of said sections, supporting and traction wheels for said frame sections, respectively, a pair of guides secured to said gussets and extending upwardly from said low section, an elevating member engaging said guides, a power unit on said elevated section, having a winding drum, and means including a flexible member and sheaves for raising and lowering said elevating member.

3. In apparatus of the class described, the combination of a frame comprising a relatively low section, an elevated section overlapping at its inner end the inner end of said low section and gussets connected along their upper and lower edges to the overlapping portions of said sections, supporting and traction wheels for said frame sections, respectively, a pair of guides secured to the outer faces of said gussets and extending upwardly from said low section along the outer edges of said gussets, an elevating member engaging said guides, a power unit on said elevated section, having a winding drum, and means including a flexible member and sheaves for raising and lowering said elevating member.

4. In apparatus of the class described, the combination of a frame, traction and supporting wheels therefor, a pair of guides disposed vertically on said frame, an elevating member having a load supporting section and inwardly extending arms disposed on the outer sides of said guides and rollers arranged on the inner sides of said arms and engaging the outer sides of said guides, and means for raising and lowering said elevating member, said means including a power driven member, rotatable elements carried by said guides and elevating member and a flexible element running over said rotatable elements and operated by said driven member.

5. In apparatus of the class described, the combination of a frame, traction and supporting wheels therefor, a pair of guides disposed vertically on said frame, an elevating member having a load supporting section and a vertical section, said vertical section comprising inwardly extending arms and upright members disposed on the outer sides of said guides, upper and lower pairs of rollers carried by said upright members and engaging the outer sides of said guides and a plate connecting said upright members together, a power unit, and means operated by said power unit for raising and lowering said elevating member, said means comprising a flexible member and sheaves carried by said guides and said plate.

6. In apparatus of the class described, the combination of a frame, traction and supporting wheels therefor, a pair of guides disposed vertically on said frame, an elevating member having a load supporting section and a vertical section, said vertical section comprising inwardly extending arms and upright members disposed on the outer sides of said guides, upper and lower pairs of rollers carried by said upright members and engaging the outer sides of said guides, a plate connecting said upright members together, a connector between the free end of each arm and the upper end of the adjacent member, a power unit, and means operated by said power unit for raising and lowering said elevating member, said means comprising a flexible member and sheaves carried by said guides and said plate.

7. In apparatus of the class described, the combination of a frame, traction and supporting wheels for said frame, a pair of vertical guides on said frame, an elevating member having arms disposed at opposite sides of said guides, rollers on said arms engaging the outer sides of said guides, a pair of sheaves carried by said elevating member, a power unit on said frame and provided with a pair of drums, pairs of sheaves supported at the upper ends of said guides, and flexible members arranged to wind on and off said drums and running around said pairs of sheaves to raise and lower said elevating member, said pairs of sheaves supported at the upper ends of said guides being disposed at inclined angles thereto, whereby the flexible members clear the power unit while winding on and off said drums and running around said inclined sheaves.

8. In apparatus of the class described, the combination of a frame, traction and supporting wheels for said frame, a pair of vertical guides on said frame, an elevating member comprising a horizontal section and a vertical section having a transverse plate and arms extending inwardly at opposite sides of said guides, rollers on said inwardly extending arms engaging the outer sides of said guides, a pair of sheaves carried by said transverse plate, a power unit on said frame and provided with a pair of drums, pairs of sheaves supported at the upper ends of said guides, and flexible members arranged to wind on and off said drums and running around said pairs of sheaves to raise and lower said elevating member, said pairs of sheaves supported at the upper ends of said guides being disposed at inclined angles, whereby the flexible members clear the power unit while winding on and off said drums and running around said inclined sheaves.

9. An apparatus as claimed in claim 4 in which all of said rotatable elements are disposed between the guides.

In testimony whereof, I have hereunto subscribed my name.

EDWARD H. REMDE.